(12) United States Patent
Kettler et al.

(10) Patent No.: US 7,044,491 B2
(45) Date of Patent: May 16, 2006

(54) TRICYCLE

(75) Inventors: Joachim Kettler, Ense (DE); Heinz Kettler, Ense (DE); Reinhard Rocholl, Soest (DE)

(73) Assignee: Heinz Kettler GmbH & Co. KG, Ense (DE)

( * ) Notice: Subject to any disclaimer, the term of this patent is extended or adjusted under 35 U.S.C. 154(b) by 27 days.

(21) Appl. No.: 10/446,166

(22) Filed: May 28, 2003

(65) Prior Publication Data

US 2004/0080139 A1 Apr. 29, 2004

(30) Foreign Application Priority Data

Oct. 23, 2002 (DE) .......................... 202 16 271 U
Jan. 30, 2003 (DE) .......................... 203 01 459 U

(51) Int. Cl.
*B62K 1/00* (2006.01)

(52) U.S. Cl. .......................... 280/282; 280/293

(58) Field of Classification Search ................ 280/267, 280/268, 269, 282, 293
See application file for complete search history.

(56) References Cited

U.S. PATENT DOCUMENTS

| | | | | |
|---|---|---|---|---|
| 1,550,133 A | * | 8/1925 | Whitehall | .................. 280/267 |
| 1,599,223 A | * | 9/1926 | Epps | .......................... 280/269 |
| 1,607,972 A | * | 11/1926 | Mangold | .................... 280/7.15 |
| 2,207,161 A | * | 7/1940 | Roe | ............................ 280/269 |
| 2,812,194 A | | 11/1957 | Ajero | |
| 2,995,384 A | | 8/1961 | Rich | |
| 3,062,559 A | * | 11/1962 | Hewitt | ...................... 280/202 |
| 3,206,223 A | * | 9/1965 | Frye | ........................... 280/274 |
| 3,485,507 A | | 12/1969 | Christof | |
| 4,272,095 A | * | 6/1981 | Ptaszek | ..................... 280/220 |
| 4,327,929 A | * | 5/1982 | Melzian | ..................... 280/282 |
| 4,497,502 A | * | 2/1985 | Forbes et al. | .............. 280/282 |
| 5,501,478 A | * | 3/1996 | Doan | ......................... 280/282 |
| 6,402,174 B1 | * | 6/2002 | Maurer | ...................... 280/267 |
| 6,685,207 B1 | * | 2/2004 | Blake | ......................... 280/282 |
| 2003/0141693 A1 | * | 7/2003 | Wu | ............................ 280/263 |

FOREIGN PATENT DOCUMENTS

| | | | |
|---|---|---|---|
| DE | 10032295 | * | 4/2002 |
| WO | WO 01/87689 | | 11/2001 |

* cited by examiner

*Primary Examiner*—Anne Marie Boehler
(74) *Attorney, Agent, or Firm*—Hoffman, Wasson & Gitler PC

(57) ABSTRACT

A tricycle, including at least one frame, at least one front wheel, which is disposed in the front region of the frame, when viewed with respect to the preferred travel direction of the tricycle, and is steerable via a steering handle, and at least two rear wheels which are disposed in the rear region of the frame when viewed with respect to the preferred travel direction, wherein pivotal means are provided, which permit the rear wheels to be pivotable.

13 Claims, 4 Drawing Sheets

TRICYCLE

BACKGROUND OF THE INVENTION

The present invention relates to a tricycle.

Tricycles of the aforesaid type are sufficiently known. Tricycles are essentially a child's toy by means of which children are to prepare themselves for cycling in a play-like manner. It is also desirable to take tricycles on walks. Here, the children can either drive the tricycle themselves or, however, they may be pushed by a person who does not sit on the tricycle. For such purpose, tricycles are mainly provided with a push rod, which is provided at the rear of the tricycle, and by means of which the tricycle can be conveniently pushed.

However, more especially when tricycles are pushed via the push rod, it is problematical here to transpose to the tricycle the change in travel direction which is intended by the person pushing the tricycle. On the one hand, it is possible for the child himself to determine the travel direction via the rotatable steering handle. On the other hand, apparatuses are provided, which can convert the directional controls of the push rod directly into a steering movement of the steering handle, so that the direction can substantially be prescribed by the person pushing the tricycle.

Apparatuses, which convert the directional control of the push rod or some other external force into a steering movement of the front wheel, do, however, require a complex, undesirably heavy and equally expensive mechanism.

The object of the present invention resides, therefore, in producing a tricycle which, whilst using less complex means than is known from the existing art, is suitable for being steered by the effect of external forces, though the steering force, or respectively the steering movement, is not introduced via the steering handle itself.

SUMMARY OF THE INVENTION

According to the invention, this object is achieved by a tricycle having pivotal means, which permit the rear wheels to be pivotable. A tricycle is produced, which can be steered by extremely simple means and in a very comfortable manner by a person who is not sitting on the tricycle. The advantage resides, more especially, in the fact that no complex mechanism has to be provided in order to transfer a steering movement. A force can also advantageously act on the tricycle at almost any desirable location, and such force can be converted into a steering movement, so that this can also be effected comfortably, for example, by means of a gripping point in the seat.

Provision may be made for the tricycle to include pushing means which permit the tricycle to be pushed and steered by a person not sitting on the tricycle, the pushing means preferably being able to act on the pivotal means to steer the rear wheels.

In one advantageous further development of the invention, provision is made for the frame to be provided at its front end with a handle-bar receiving means, which constitutes the receiving means for a rotatable handle-bar, the handle-bar being provided at the top end with the steering handle and at the bottom end with a fork, the fork constituting the receiving means for a front wheel. Accordingly, the tricycle can therefore also be steered by a person who is himself located on the tricycle. Nevertheless, the possibility of steering by a third party, who exerts a force upon the tricycle in any desirable manner, remains optional.

To introduce a pushing force or, however, a steering movement by a third party, provision is advantageously made for the pushing means to include a protruding push rod. A high degree of user comfort results, more especially, when the end of the push rod is disposed at a predetermined height which is advantageous in terms of the operating technique.

One advantageous further development of the present invention also arises when the push rod can be accommodated in a receiving means which permits a detachable securement thereof. Accordingly, the push rod can be removed if required, for example during transportation, and be stowed separately.

The front wheel of a tricycle according to the invention may be provided advantageously with a foot pedal, whereby the tricycle can be driven by the legs.

An additional advantageous further development of the present invention resides in providing, for the frame, a first tubular profile and a second tubular profile, the tubular profiles being able to telescope one inside the other. A tricycle is hereby produced which, on the one hand, can be reduced to a minimum size for transportation and, on the other hand, it is ensured that the tricycle can be adjusted according to the size of the user and can "grow with the user", so to speak.

A clamping bush is advantageously provided on the second tubular profile and is suitable for securing the first tubular profile relative to the second tubular profile. This measure ensures that a selected setting is maintained, and an adjustability is ensured.

As an additional advantageous further development of the present invention, provision is made for a seat to be attached to the frame, and for it to be securable in any desirable position along the frame, so that virtually any desirable adaptation measures for the user can also be taken here.

The seat is advantageously provided with a gripping point, so that a force, which is convertible into a change of travel direction, can be introduced in a comfortable manner.

In a further development of the invention, as an advantageous pivotal means, which can permit the pivotability of the rear wheels, provision is made for pivotably mounted U-shaped profiles to serve as the receiving means for the rear wheels.

The U-shaped profiles are advantageously pivotably mounted on the ends of a rear axle attached to the frame, so that a certain spacing between the rear wheels is achieved via the axle, which may also be a rigid axle, and, in consequence, the stability of the tricycle is increased.

For the synchronisation of the pivotal movement of the rear wheels, provision is advantageously made for the U-shaped profiles to be provided with a protruding lever, the levers being connected to a steering strut. This measure can ensure that the travel direction of the rear wheels is identical.

One advantageous further development of the present invention also resides in providing the pivotal means with a securing device, since the state of a tricycle according to prior art can be established hereby, more especially when, for example, a steering from externally is undesirable or is not required.

One example of a securing device is a clamping sleeve which is attached to at least one of the levers and is suitable for securing the transverse strut relative to the lever.

A securing screw is advantageously provided as the securing element.

In an alternative embodiment, the securing device includes a locking bar which is insertable into a receiving means on the steering strut in such a manner that the steering strut is secured relative to the frame. The locking bar in such case may be provided with a handle, so that it can easily be displaced to secure the steering strut.

BRIEF DESCRIPTION OF THE DRAWINGS

Additional features and advantages of the present invention become evident from the following description of preferred embodiments with reference to the accompanying drawings. In the drawings.

DETAILED DESCRIPTION OF THE INVENTION

Figure 1:
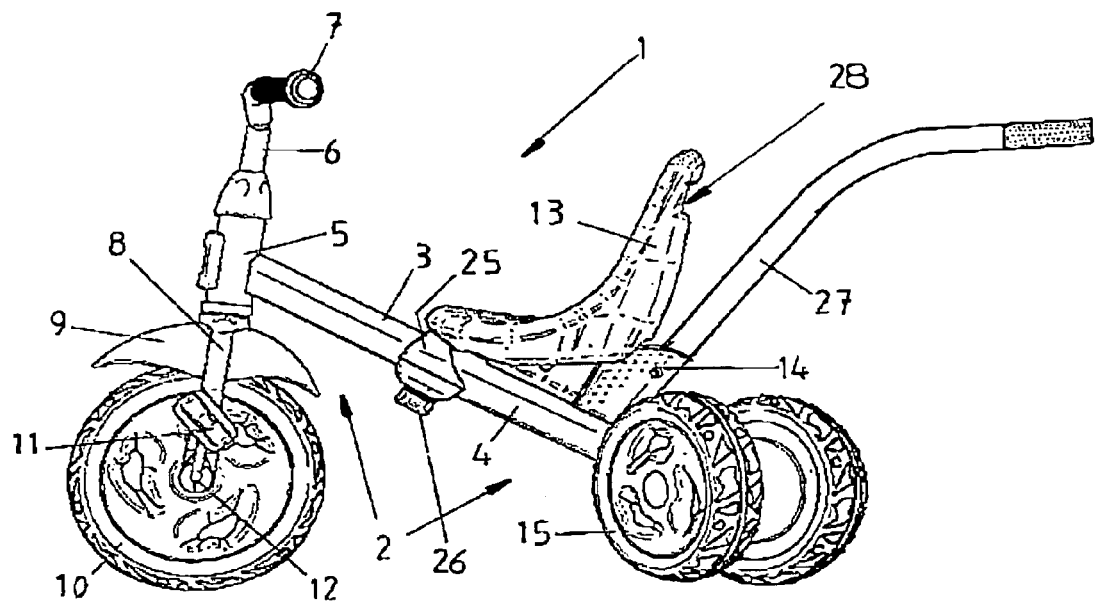
FIG. 1 is a side elevational view of a first embodiment of a tricycle according to the invention.

A tricycle according to the invention substantially includes a frame 2, as well as a front wheel 10, which is disposed in the front region of the frame 2 in a preferred travel direction, and two rear wheels 15 disposed at the rear (see FIG. 1 in this connection).

The frame 2 substantially comprises a first tubular profile 3 and a second tubular profile 4, the tubular profiles 3, 4 being able to be telescoped one inside the other. Furthermore, a clamping bush 25 is provided with an adjustment screw 26 on the side of the second tubular profile 4 facing the first tubular profile 3, said bush permitting the two tubular profiles 3, 4 to be secured relative to each other. Tunnel-shaped hollow profiles are mainly used here as the tubular profiles 3, 4.

A handle-bar receiving means 5 is provided at the front end of the first tubular profile 3, and a handle-bar 6 is substantially rotatably mounted in said means. A steering handle 7 is attached to the top end of the handle-bar 6, the other end of the handle-bar 6 being provided with a fork 8. The front wheel 10, which is mounted on a spindle 12, is accommodated in the fork 8, said spindle being provided with foot pedals 11 at its ends. A mudguard 9 extends through the fork 8.

Figure 3:
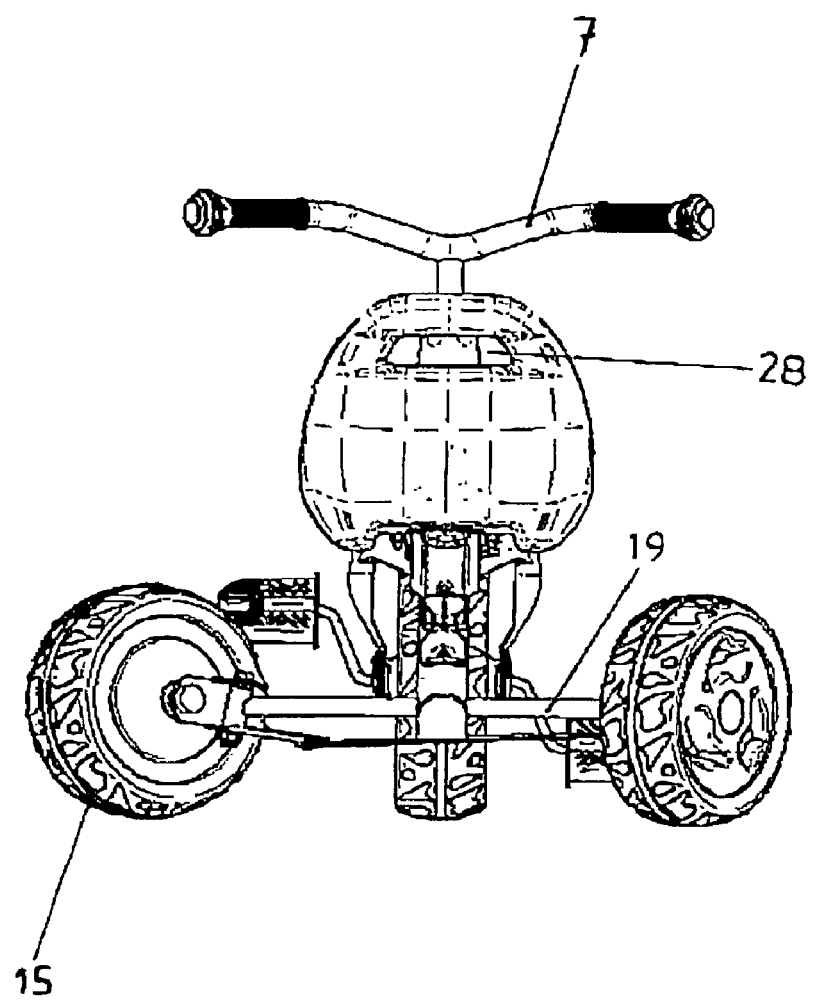
FIG. 3 is a rear view of the tricycle according to the invention as shown in FIG. 1.

A seat 13 is provided, moreover, which is securable on the second tubular profile 4 at any desirable location along the frame 2. In the upper region, the seat 13 includes a gripping point 28 which may be used, for example, as a supporting handle (see FIG. 3 in this connection). Moreover, a receiving means 14 for a push rod 27 is provided behind the seat 13 on the second tubular profile 4. If the push rod 27 is no longer needed, the receiving means 14 may be used for the mounting of, for example, a basket or some other device.

Figure 2:
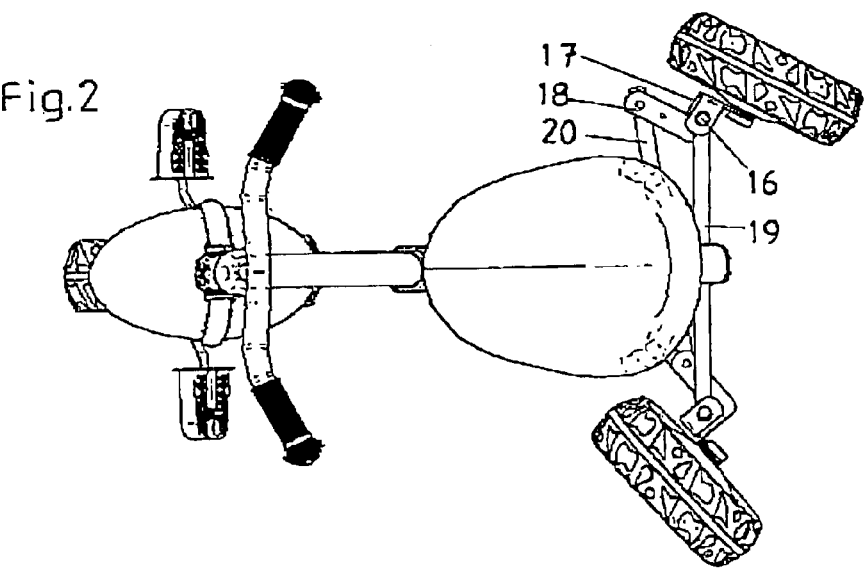
FIG. 2 is a plan view of the tricycle according to the invention as shown in FIG. 1.

A rear axle 19 is attached to the end of the second tubular profile 4 and, in turn, it is provided with U-shaped profiles 17 at its ends (see FIG. 2 in this connection). The U-shaped profiles 17 are pivotably mounted on the rear axle 19 via pivot pins 16 and form the receiving means for the pivotable rear wheels 15 via a flange 23 and spindles 21. Moreover, the U-shaped profiles 17 include a protruding lever 18, the levers 18 being interconnected via a steering strut 20 (see FIG. 4 in this connection).

In consequence, the steering strut 20 ensures that the travel direction of the rear wheels 15 can be synchronised.

Figure 4:
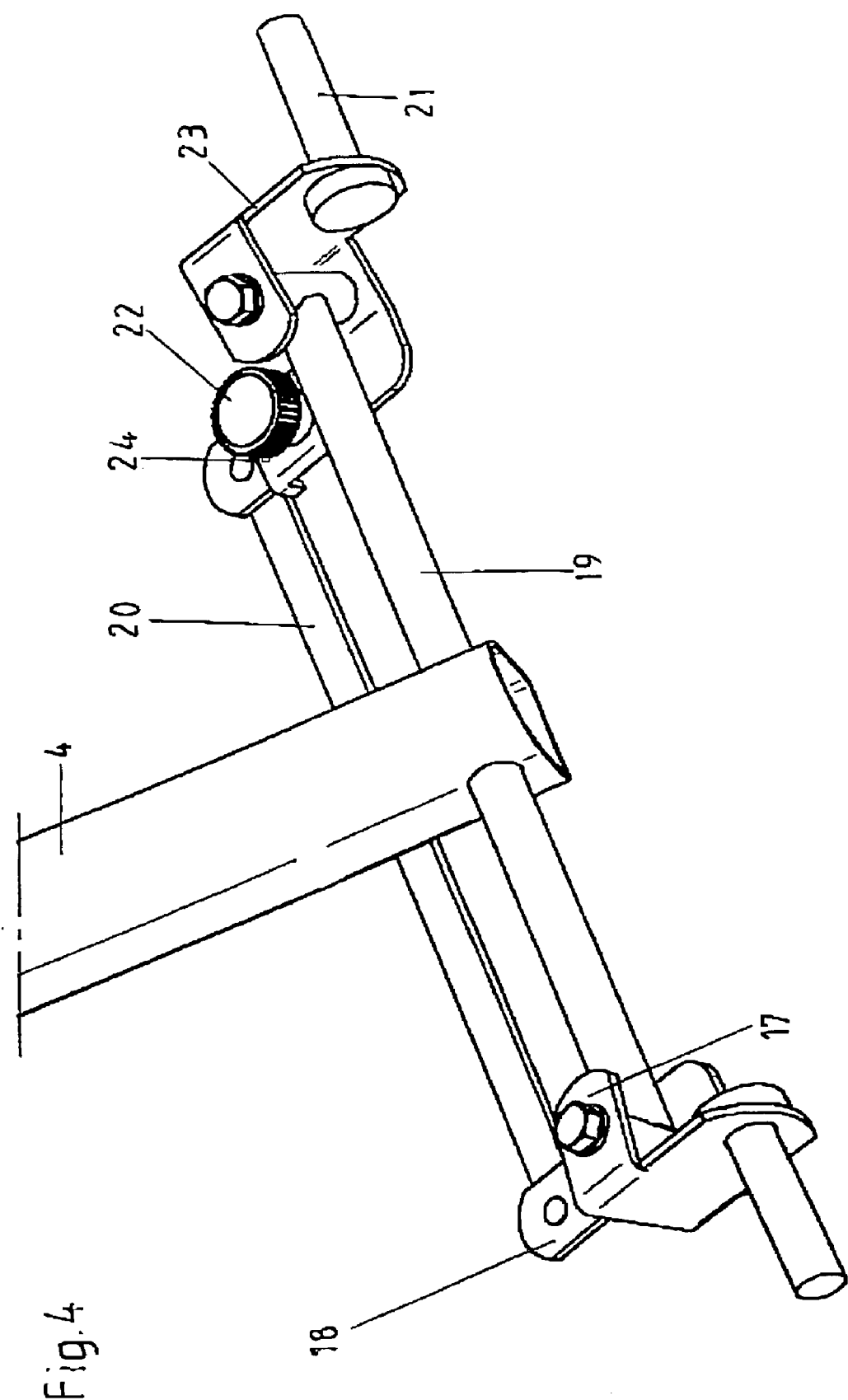
FIG. 4 is a perspective view of a rear axle of the tricycle according to the invention as shown in FIG. 1.

Moreover, in the embodiment according to FIG. 4, a securing device is provided with a clamping sleeve 24 and an adjustment screw 22 on the lever 18, which screw ensures that the lever 18 can be secured at right angles to the steering strut 20. This measure can ensure that the rear wheels 15 are not pivoted and that, in consequence, the state of a conventional tricycle 1 according to prior art, with non-pivotable rear wheels 15, can be rendered possible.

Figure 5:
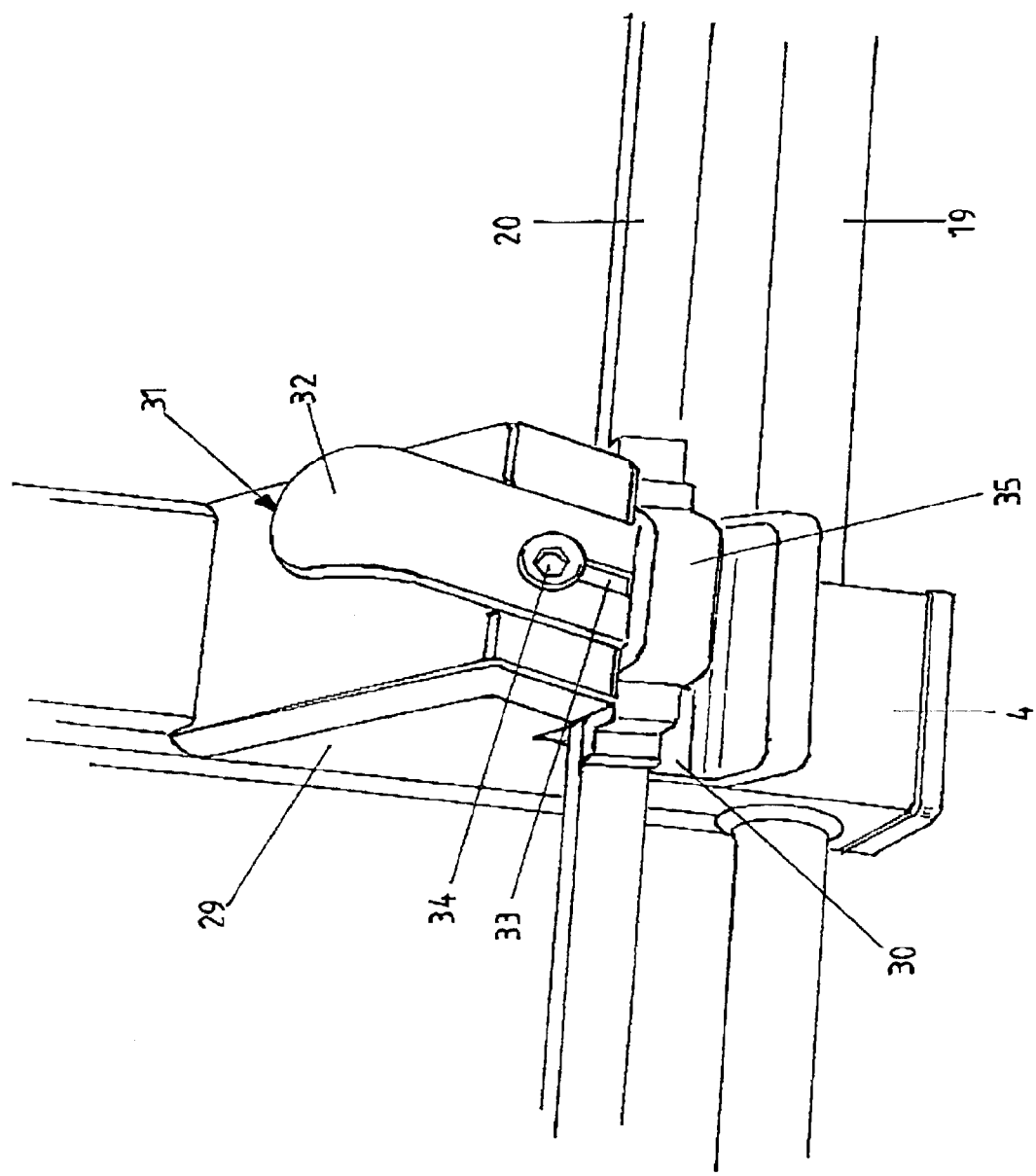
FIG. 5 is a detailed perspective view from below of a rear axle of a second embodiment of a tricycle according to the invention.

FIG. 5 illustrates an alternative embodiment of a securing device. In the embodiment illustrated therein, a retaining block 29 is attached to the underside of the second tubular profile 4 and has a recess 30 for the steering strut 20. A locking bar 31, which is displaceable in the longitudinal direction of the tricycle, is attached to the underside of the retaining block 29 and has a handle 32. In addition, the locking bar 31 includes an elongate slot 33, through which there extends a screw 34, which is screwed into the retaining block 29.

In one position, in which the levers 18 form a right angle with the rear axle 19, the locking bar 31 can be inserted into a yoke-shaped receiving means 35 on the steering strut 20, whereby the steering strut 20 is secured in the aforesaid position relative to the second tubular profile 4 and, hence, relative to the frame 2.

What is claimed is:

1. A tricycle comprising:
   at least one frame;
   at least one front wheel, which is disposed in a front region of the frame, when viewed with respect to the preferred travel direction of the tricycle, and is steerable via a steering handle; and
   at least two rear wheels which are disposed in a rear region of the frame when viewed with respect to the preferred travel direction;
   wherein pivotal means are provided, which permit the rear wheels to be pivotable;
   pushing means permitting the tricycle to be pushed and steered by a person not sitting on the tricycle;
   wherein the pushing means act on the pivotal means to steer the rear wheels;
   the pushing means includes a protruding push rod
   the pivotal means are provided with a securing device;
   wherein the securing device includes a steering strut extending between the two rear wheels, a locking bar which is insertable into a receiving means on the steering strut in such a manner that the steering strut is secured relative to the frame.

2. The tricycle according to claim 1, wherein the frame is provided at its front end with a handle-bar receiving means, which constitutes the receiving means for a rotatable handle-bar, the handle-bar being provided at the top end with the steering handle and at a bottom end with a fork, the fork constituting the receiving means for a front wheel.

3. The tricycle according to claim 1, wherein the push rod is detachably mounted in a receiving means.

4. The tricycle according to claim 1, wherein the front wheel is provided with a pair of foot pedals.

5. The tricycle according to claim 1, wherein the frame includes a first tubular profile and a second tubular profile, the first and second tubular profiles being able to telescope one inside the other.

6. The tricycle according to claim 5, further comprises a clamping bush provided on the second tubular profile and the clamping bush is suitable for securing the first tubular profile relative to the second tubular profile.

7. The tricycle according to claim 1, further comprising a seat attached to the frame and the seat is securable in any desirable position along the frame.

8. The tricycle according to claim 7, wherein the seat is provided with a gripping point.

9. The tricycle according to claim 1, wherein the pivotal means are pivotably mounted U-shaped profiles which form receiving means for the rear wheels.

10. The tricycle according to claim 9, wherein the U-shaped profiles are provided on the ends of a rear axle attached to the frame.

11. The tricycle according to claim 9, wherein the U-shaped profiles are provided with a protruding lever, the levers being interconnected via a steering strut.

12. A tricycle comprising:
   at least one frame;
   at least one front wheel, which is disposed in a front region of the frame, when viewed with respect to the preferred travel direction of the tricycle, and is steerable via a steering handle; and
   at least two rear wheels which are disposed in a rear region of the frame when viewed with respect to the preferred travel direction;
   wherein pivotal means are provided, which permit the rear wheels to be pivotable;
   pushing means permiting the tricycle to be rushed and steered by a person not sitting on the tricycle;
   wherein the pushing means act on the pivotal means to steer the rear wheels;
   the pushing means includes a protruding push rod
   the pivotal means are provided with a securing device,
   wherein the securing device comprises a steering strut extending between said rear wheels, a lever attached to one of said rear wheels, a clamping sleeve attached to said lever and securing the transverse strut relative to the lever.

13. The tricycle according to claim 12, wherein the clamping sleeve is tensioned via a securing screw.

* * * * *